Nov. 8, 1932.  M. A. SMITH  1,887,107

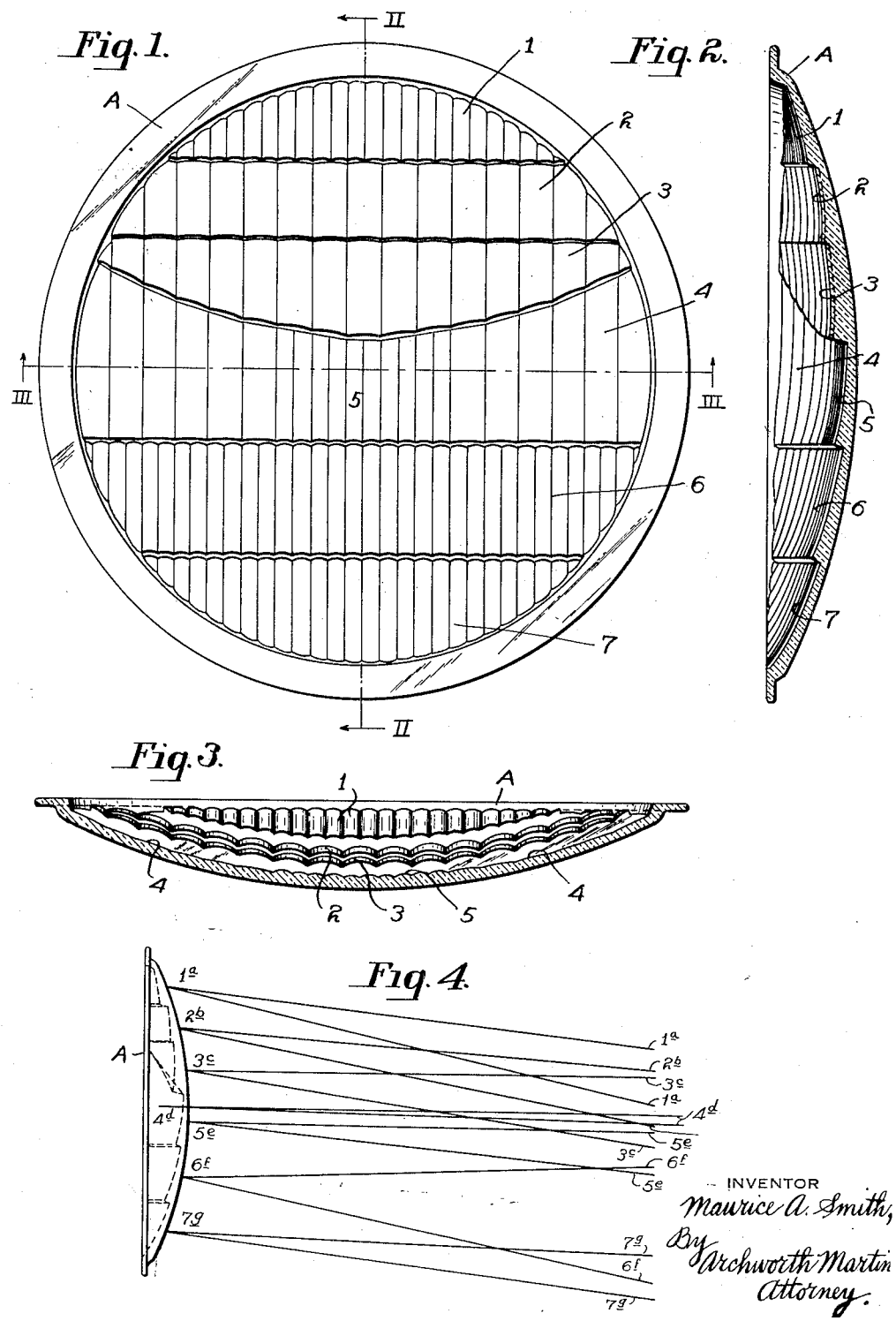

LAMP LENS

Filed Oct. 1, 1931  2 Sheets-Sheet 2

INVENTOR.
Maurice A. Smith,
By Archworth Martin,
Attorney.

Patented Nov. 8, 1932

1,887,107

UNITED STATES PATENT OFFICE

MAURICE A. SMITH, OF JEANNETTE, PENNSYLVANIA, ASSIGNOR TO McKEE GLASS COMPANY, OF JEANNETTE, PENNSYLVANIA, A CORPORATION OF PENNSYLVANIA

LAMP LENS

Application filed October 1, 1931. Serial No. 566,262.

My invention relates to lamp lenses, and particularly to those of the type commonly employed with the headlights of motor vehicles.

The lens hereinafter described is especially useful in connection with headlamps having reflectors of the parabolic or spherical type and containing two lighting filaments, one of which is located on the axial line of the reflector, near its center, and the other filament located slightly above said line.

The lower filament supplies illumination for the upper beam or distance lighting, while the upper filament, owing to its location above the axis of the reflector is utilized to form a depressed or lower beam that is projected against the roadway at a point closer to the vehicle.

Difficulty has been experienced in providing lenses that will meet the requirements of the laws in various States, and at the same time avoiding the necessity of making a special form of lens for each State. Considerable difficulty arises because of the fact that a lamp and a lens which produce a desired illuminating effect in the upper or distance beam will produce a different general effect in the lower beam, so that while the beam produced by the centrally-located filament may comply with the lighting laws and also produce satisfactory practical results in the way of light distribution, the lower beam produced by the upper filament may in some cases be unsatisfactory.

My invention has for its object the provision of a lens having prisms of such form and so arranged as to compensate for the angular difference in light projection by the two filaments, so that there is proper spread and depth of beam, both in the case of the upper beam and in the case of the lower beam, with no pronounced light and dark spots in the field of illumination on the roadway.

Figure 5:
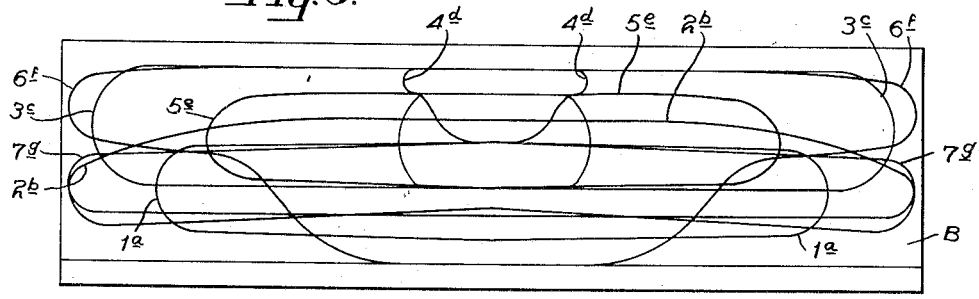
Figure 6:
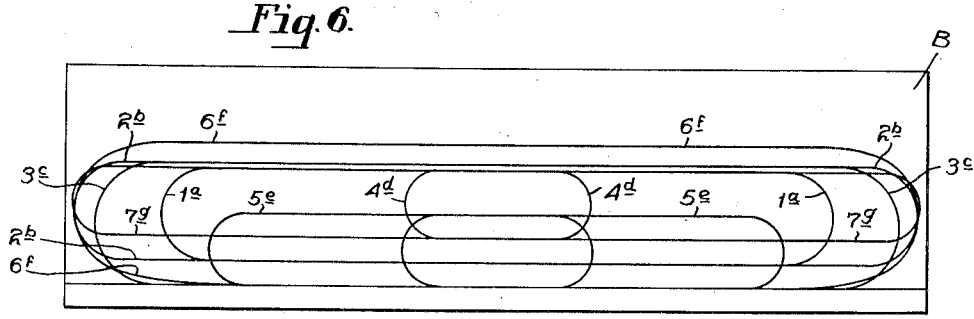

In the accompanying drawings, Figure 1 shows a rear face view of a lens made according to my invention; Fig. 2 is a view taken on the line II—II of Fig. 1; Fig. 3 is a view taken on the line III—III of Fig. 1; Fig. 4 is a diagrammatic view showing the vertically angular directions taken by the light rays in passing through the prisms of the lens; Fig. 5 is a view showing the fields of illumination produced on a screen by the various prisms of the lens, with the central or lower filament as the source of illumination; Fig. 6 is a similar view, but showing the fields of light emanating from the upper filament of the lamp, and Figs. 7 to 13 are individual views on reduced scales of the fields of light shown in Figs. 5 and 6.

The lens A has the general contour of an ordinary head-lamp lens of the convex type and is provided with a series of approximately horizontal prisms 1, 2, 3, 4, 5, 6 and 7, the prisms being provided with vertical ribs or flutes to effect proper spread of the light in lateral and horizontal directions, each prism as a whole, of course, with the exception of 4, which is practically on the axis, serving to bend the light rays downwardly.

It will be noted that the prisms 1, 2 and 3 are of considerable thickness relative to various of the other prisms, and that the prism 5 is thicker than the prisms 4 at either side thereof. The light rays from the central prism 5 are, of course, quite bright and the prism bends them to a lower plane than that to which the rays passing through the prisms 4 are bent, as indicated at $4d$ and $5e$ in Figs. 4, 5 and 6. These fields of illumination are separately shown on a screen B, in Figs. 10 and 11, respectively, for greater clearness.

The high intensity of the upper beam is located at the top of the beam pattern with a gradual lessening of the intensities of other sections from the top of the beam pattern to the bottom, so that the driver may look to the farthest distant point in the illuminated space without any eye strain of looking at or past high intensity points.

Figure 7:
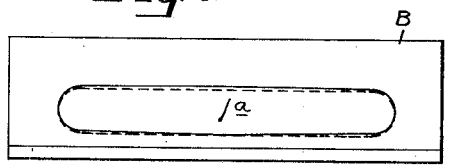
Figure 8:
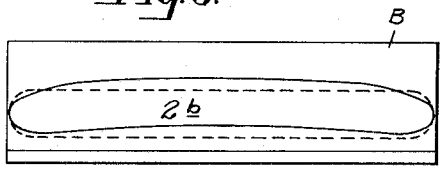
Figure 9:
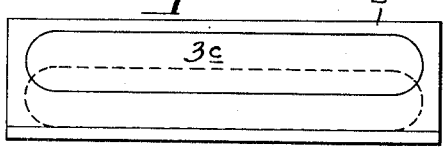
Figure 10:
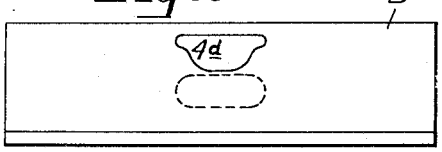
Figure 11:
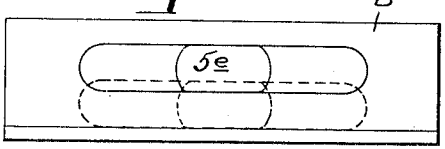
Figure 12:
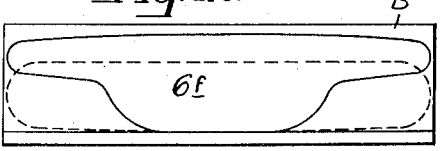
Figure 13:
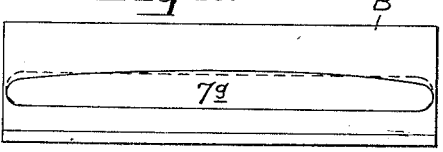

The light emanating from 1 is indicated at $1a$ on Figs. 5, 6 and 7 of the drawings. The prism 2 produces upper and lower fields of illumination as shown at $2b$ in Figs. 5 and 6, depending, of course, upon which of the two filaments is illuminated. The shape of the field of light emanating from 2 is shown at $2b$ in Fig. 8, the full line $2b$ indicating the field when the central filament is energized, and the dotted line indicating the field of light produced from the upper filament. Similarly, the fields of light from 3 are indicated at 3c in Figs. 5, 6 and 9 of the drawings, by full and dotted lines, representing the lighting by the lower and upper filaments, respectively. The distribution of light from the prism 6 is shown at 6f in Figs. 5, 6 and 12, while the fields of light from 7 are shown at 7g in Figs. 5, 6 and 13.

The overlapping fields of light from the various prisms produce a composite beam that does not have pronounced bright spots in close proximity to areas of far less intense illumination, but produce a composite beam of gradually modulated intensities that effects illumination at a uniform intensity, no matter which of the two filaments is illuminated, so that clearer visibility is afforded the driver, without confusing lights and shadows.

While the vertical spread of the composite beam is much less in Fig. 6, with the upper filament illuminated than in the case of Fig. 5 which represents illumination from the lower filament, it will be seen that the fields of light from the various prisms merge with one another with considerable symmetry, and that while the individual fields are lowered somewhat or even narrowed in vertical directions, they nevertheless occupy the same general relation to the other fields as in Fig. 5.

One of the lower prisms, preferably the prism 6 produces a greater vertical spread than do the upper prisms such as 2 and 3. The light rays emerging from this prism therefore merge to form a portion of the composite beam, the upper portion of the field 6f supplementing the fields 3c and 2b when the central or lower filament is illuminated. When the upper filament is illuminated, the light rays pass through the prism 6 at such angle that the vertical spread is reduced as indicated by dotted lines in Fig. 12.

If one of the upper prisms 1, 2 or 3 were given a wide vertical spread, the beam of light would extend to a too high elevation both during illumination of either the lower filament or the upper filament, whereas the lower prism 6 can safely be given sufficient vertical spread to supplement the fields of light 1a, 2b and 3c, when either filament is illuminated.

As indicated above, the lens is particularly useful with headlamps having two lighting filaments, one of which is located on the axial line of the reflector, and the other above said axial line, the axial line of the reflector also intersecting the center of the lens, and produces a composite light beam of modulated intensities to effect a lighting field of uniform intensity.

I claim as my invention:—

A headlight lens provided with a horizontal prism disposed across the mid portion of the lens, three superposed horizontally-extending prisms above the first-named prism, and two superposed horizontal prisms below the first-named prism, the two uppermost prisms and the lowermost prism being so constructed as to form the lower portion of a beam of light, the central portion of the first-named prism being so thickened as to produce a second portion of the beam of light, the remaining portions of the first-named prism and the prism immediately above the same being so constructed as to form a third and upper portion of the beam, and the prism immediately below the mid prism being of such angularity as to produce a field of illumination whose vertical spread is such that it will completely overlie, in a vertical direction, the composite pattern produced on a screen by the light rays which emerge from the other prisms.

In testimony whereof I, the said MAURICE A. SMITH, have hereunto set my hand.

MAURICE A. SMITH.